United States Patent [19]

O'Neill

[11] 3,943,296

[45] Mar. 9, 1976

[54] METHOD AND APPARATUS FOR REDUCING NOISE IN PAM TIME DIVISION NETWORKS

[75] Inventor: John Francis O'Neill, Boulder, Colo.

[73] Assignee: Bell Telephone Laboratories Incorporated, Murray Hill, N.J.

[22] Filed: Aug. 2, 1974

[21] Appl. No.: 494,083

[52] U.S. Cl. .......................................... 179/15 AN
[51] Int. Cl.² .......................................... H04J 3/10
[58] Field of Search ......... 179/15 AN, 15 A, 15 BL, 179/170 R, 170.8, 15 AT; 178/2 B, 2 D, 50, 56, 63 A, 63 B, 69 B, 69 E, 70 TS; 332/38; 343/203, 204

[56] References Cited
UNITED STATES PATENTS

| | | | |
|---|---|---|---|
| 2,553,572 | 5/1951 | Frum | 179/15 AN |
| 3,188,394 | 6/1965 | McMillian | 179/15 BL |

Primary Examiner—William C. Cooper
Assistant Examiner—Joseph Popek
Attorney, Agent, or Firm—F. W. Padden; E. J. Olinder

[57] ABSTRACT

In pulse amplitude modulated time division switching systems, noise and crosstalk often result because the time division switches used to connect individual channels to a common bus are not perfect open circuits when they are in the off-state. The switches in the off-state possess a small parasitic capacitance which couples energy on the common bus to the channel resulting in a noise signal during time slots which are not associated with the channel. A method is disclosed for substantially reducing crosstalk and noise induced by stray capacitances without increasing the complexity of the time division switch. Each pulse on the common bus is converted into a bipolar pulse in which positive and negative portions have equal average values. In addition, the timing of each of the time division switches is modified to extract the desired signal by sampling the first portion of the bipolar pulse in the appropriate time slot for that channel, and rejecting the second portion of the bipolar pulse. The noise energy which is coupled from the common bus to the channel by stray switch capacitance during other time slots remains essentially bipolar in form and tends to cancel itself. The noise power at low frequencies is therefore substantially reduced. Apparatus is also disclosed for converting pulses on the common bus into the bipolar format required by the invention.

11 Claims, 3 Drawing Figures

3,943,296

METHOD AND APPARATUS FOR REDUCING NOISE IN PAM TIME DIVISION NETWORKS

BACKGROUND OF THE INVENTION

This invention relates to the reduction of noise and crosstalk in time division switching systems and in particular, the reduction of noise and crosstalk in pulse amplitude modulated time division switching systems.

Time division switching systems are typically arranged so that a plurality of station sets can be connected in pairs via a common bus or highway. This is accomplished by connecting each station to the common bus by a time division switch that is controlled by a master time-slot control circuit. When a communication channel is set up between stations, the master time-slot control circuit assigns a time slot to the connection and during that time slot the two stations involved are coupled to the common bus by the time division switches. At the end of the time slot, the switches are disabled to uncouple the stations from the common bus and another pair of switches are enabled to provide another communication path through the system between another pair of stations. In this manner, many communications connections may be set up through the system sequentially.

However, noise and crosstalk are produced in switching systems due to non-ideal characteristics of the time division switches. In particular, many switching systems utilize transistor switches in order to couple and uncouple the communication stations from the common bus. These transistor switches present a finite capacitance across the transistor due to leakage and packaging capacitances even when the transistor is in the off-state. Consequently, a particular communications channel is coupled to the common bus by the leakage capacitances even when its transistor switch is off and energy which is present on the common bus due to other communications connections is therefore introduced into the channel. Certain arrangements of time division switches have been developed which tend to minimize this coupling effect. However, these arrangements tend to be complicated and expensive.

Therefore, there appears to be a need for a method of reducing crosstalk and noise signals which result from time division switch stray capacitances. Accordingly, it is an object of the present invention to provide such a method which substantially reduces noise and crosstalk in a pulse amplitude modulated time division switching system.

It is a further object of the present invention to reduce noise and crosstalk without requiring substantial modifications in the time division switch.

SUMMARY OF THE INVENTION

The foregoing and other objects are achieved in accordance with the principles of the present invention in an illustrative embodiment thereof wherein a time division switching system is modified in order to make each pulse on the common bus into a bipolar pulse having equal average values in the positive and negative parts. In addition, the operation of each time division switch is modified so that the switch passes only the one portion of the pulse in the time slot associated with the channel while blocking the other portion of the bipolar pulse and all other pulses.

Specifically, a pulse splitter is inserted between the input and output sides of the common bus. The pulse splitter consists of two diode switches which are under control of the master time slot control circuit. The two diode switches control two parallel paths through the pulse splitter in which paths are inserted amplifiers and inverters. The master time slot control circuit operates the diode switches in sequential order to produce a bipolar output. The master time slot control circuit is also modified to control each time division switch to allow only one portion of the bipolar pulse associated with the channel to pass while blocking all other portions. Consequently, the desired signal is coupled to the station, but any noise signals which are coupled to the station circuit because of stray capacitances in the time division switch are bipolar in form and, therefore, tend to cancel.

The method of the invention is also applicable to those time division switching systems in which information pulses on the common bus are already bipolar in form with equal average values in the positive and negative portions. In these systems, the time division switches are advantageously controlled, according to the principles of the invention, to connect stations to the common bus and allow only one portion of the bipolar pulse to reach the receiving apparatus while disconnecting the station from the bus to prevent the other portion from reaching the receiving apparatus.

DETAILED DESCRIPTION

Figure 1:
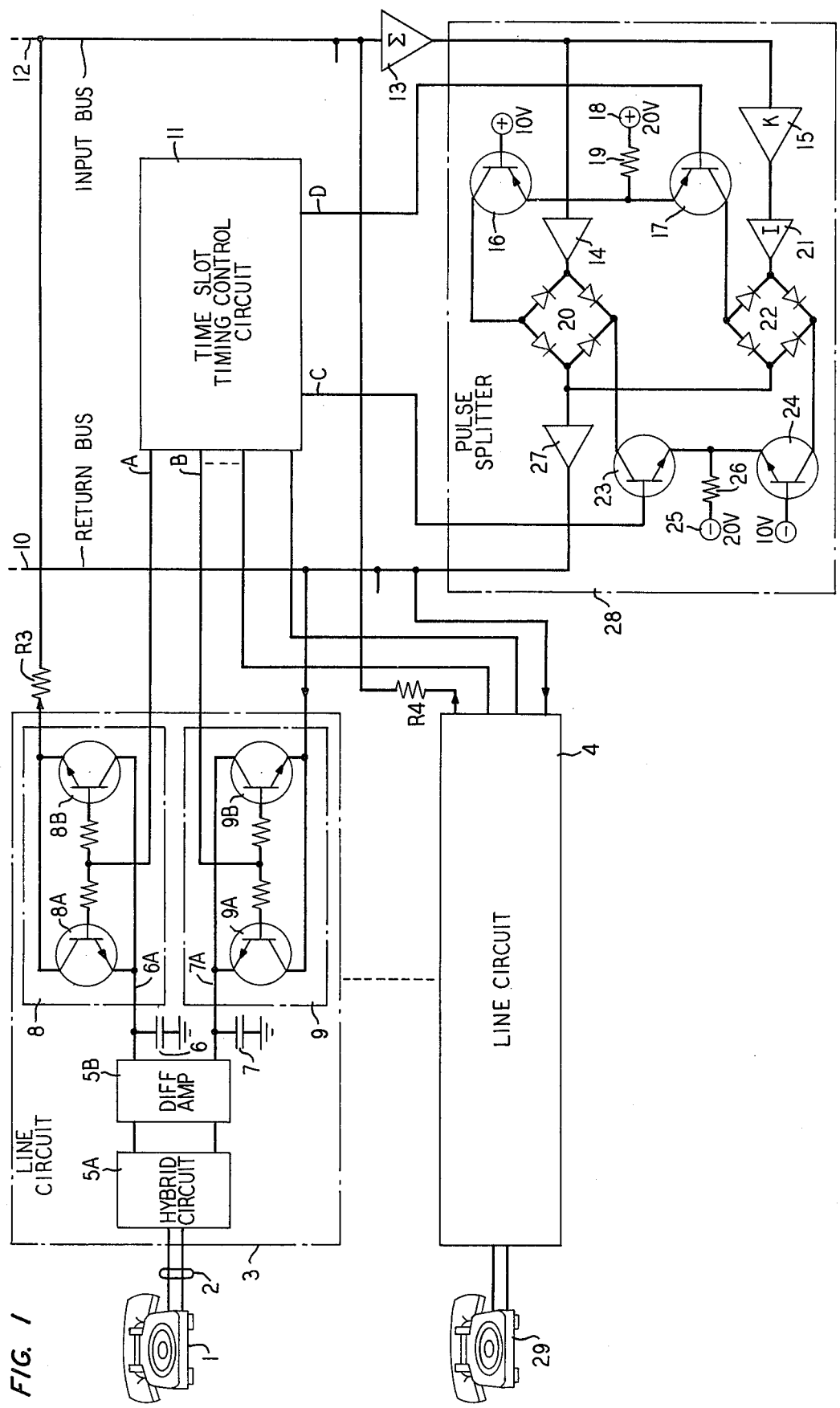
FIG. 1 of the drawing discloses a specific embodiment of my invention as incorporated into a pulse amplitude modulated time division switch system of the type described in U.S. Pat. No. 3,787,631 issued to T. G. Lewis on Jan. 22, 1974, in order to provide reduced noise and crosstalk operation.

FIG. 1 of the drawing shows a time division switching system as described in the aforementioned Lewis patent. As shown in FIG. 1, telephone station sets, such as station sets 1 and 29, may be coupled to input bus 12 and return bus 10 by means of line circuits 3 and 4, respectively. Line circuits 3 and 4 contain equivalent circuitry, however, for clarity, the detailed circuit in line circuit 4 has been omitted.

In particular, voice signals developed by station set 1 are transmitted to hybrid circuit 5A and differential amplifier 5B in line circuit 3 via line 2. Hybrid circuit 5A and differential amplifier 5B process the voice signals into a form suitable for transmission on input bus 12 and return bus 10, which signals are stored on capacitor 6. During an appropriate time slot, line circuit 3 is coupled to input bus 12 by means of time division switch 8 which is controlled by time slot timing control circuit 11 via lead A and resistor R3. Line circuit 3 can therefore pass information stored on capacitor 6 to input bus 12 when time division switch 8 is energized. During the same time slot, timing control circuit 11 also energizes time division switch 9 in line circuit 3 to couple return bus 10 to capacitor 7 so that information on return bus 10 may be transferred to capacitor 7. Information signals on capacitor 7 produce a voice signal in station set 1 after processing by hybrid circuit 5A and differential amplifier 5B. In order to set up a communications connection between two stations, such as station set 1 and station set 29, time slot timing control circuit 11 energizes the time division switches such as switches 8 and 9 in line circuit 3 and equivalent switches (not shown) in line circuit 4. Line circuits 3 and 4 are thus coupled to input bus 12 and return bus 10 and can pass information between each other. These operations and the operation of time slot control circuit 11 are described in detail in the aforementioned Lewis patent.

The time division switching circuit shown in FIG. 1 has been modified in accordance with the principles of my invention by the addition of pulse splitter 28 between input bus 12 and return bus 10. Pulse splitter 28 converts each pulse on input bus 12 into a bipolar format in which the two portions of the pulse have equal average values but are opposite in polarity.

Figure 2:
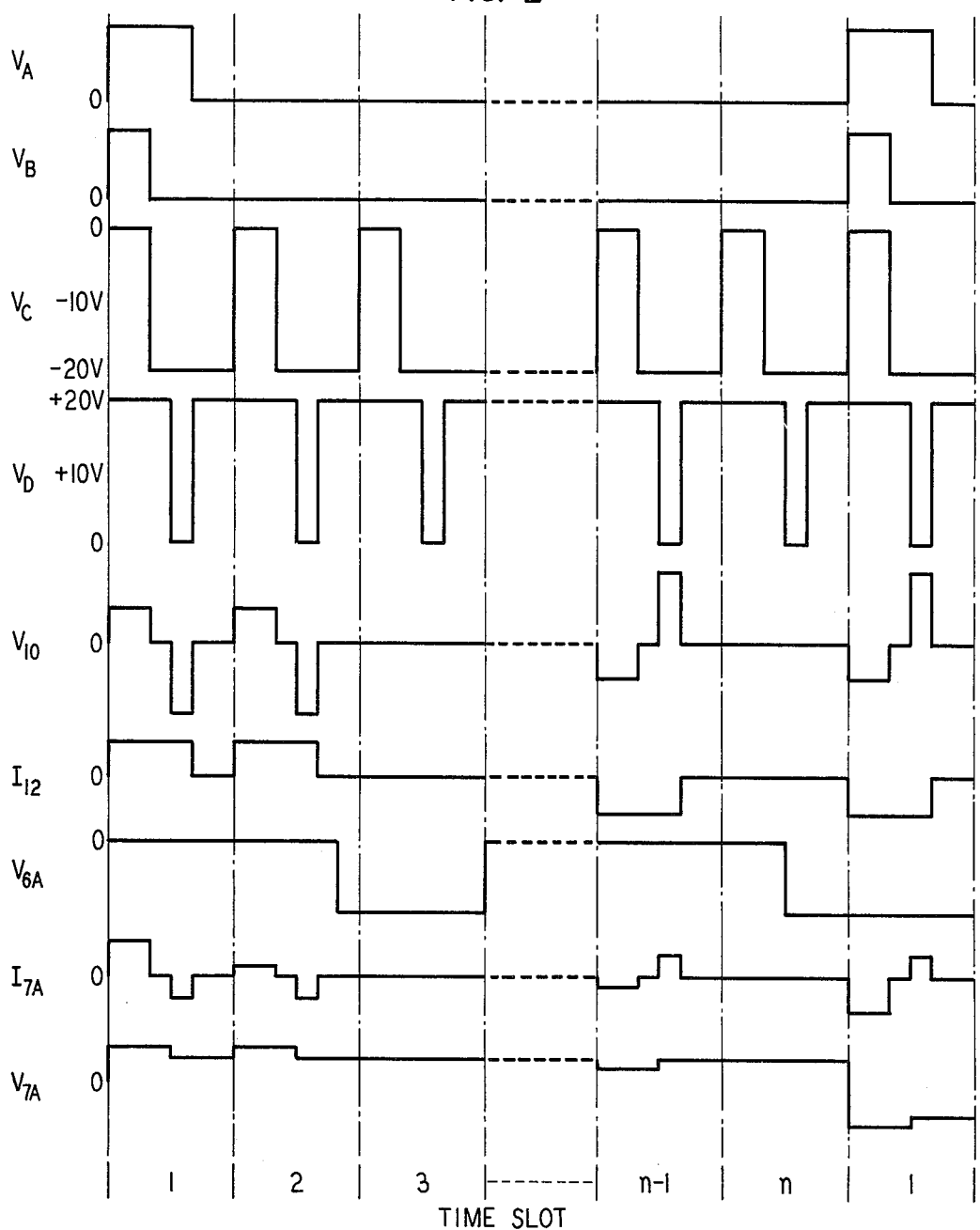
FIG. 2 of the drawing shows a plurality of signal waveforms at different points in the circuit of FIG. 1 during a number of time slots.

The operation of pulse splitter 28 and the timing of the time division switching system shown in FIG. 1 is best understood by referring to FIG. 2 in conjunction with FIG. 1. FIG. 2 shows a plurality of signal waveforms as a function of time for each time slot. For example, the first set of voltage waveforms labeled $V_A$ refers to the voltage appearing on lead A in FIG. 1 as a function of time. The current waveform labeled $I_{12}$ in FIG. 2 refers to the current signals appearing on input bus 12 in FIG. 1. In a like manner, the other signal waveforms in FIG. 2 are associated with the signals appearing on leads shown in FIG. 1. For clarity, the signal waveforms shown in FIG. 2 are idealized, that is, the effects of stray capacitances and inductances on the signal busses which would distort the waveforms are ignored. The effects of these parasitics are well known.

Figure 3:
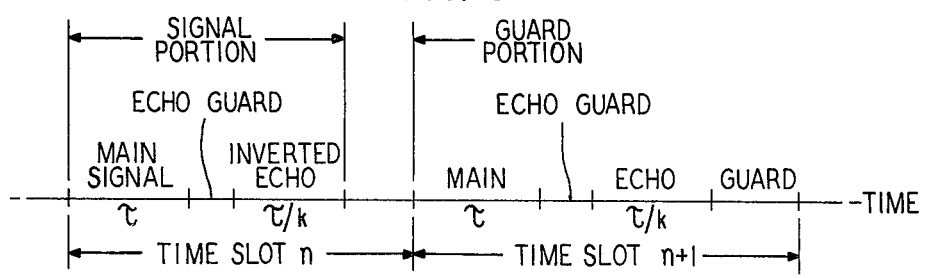
FIG. 3 shows an expanded portion of the time axis in FIG. 2 during each time slot.

The time scale in FIG. 2 has been broken up into time slots in order to facilitate explanation of the invention. The time in each time slot in FIG. 2 is divided as shown in FIG. 3. For example, an arbitrary time slot such as time slot $n$ shown in FIG. 3 is divided into two main intervals; the signal portion and the guard portion. Signals which are transmitted through the time division switching system of FIG. 1 are carried in the signal portion of FIG. 3. No signals are carried in the guard portion of the time slot which is used to prevent interference between signals carried in adjacent time slots and to allow the switching circuitry to settle down in preparation for the transmission of information in a succeeding time slot. Also, as shown in FIG. 3, the signal portion of each time slot is further broken down into three portions. The first portion is the main signal portion which is used to transmit the first part of a bipolar pulse as will be hereinafter described. The main signal portion is followed by an echo guard interval in which no signals are transmitted. The echo guard interval performs a similar function to the main guard interval in that it allows the switching circuitry to settle down prior to transmitting succeeding information. The echo guard interval is followed by an interval for transmitting the inverted echo portion of the bipolar pulse. As shown in FIG. 3, the length of the main signal portion and the inverted echo portion need not be equal. For example, if the main signal portion is of length $\tau$, the inverted echo length may be $\tau/k$ where $k$ is any number. Advantageously all that is required for my invention to operate is that the average value of the main signal and the echo signal be equal. Thus, if the main signal length is $\tau$ and the main signal amplitude is A and if the echo signal length is $\tau/k$ then the echo signal amplitude must be $kA$.

Referring back now to FIG. 2, the time axis has been divided into intervals corresponding to time slots. In addition, each interval has been further subdivided into intervals similar to those shown in FIG. 3.

Assume for the purposes of explanation that stations 1 and 29 shown in FIG. 1 desire to communicate with each other and assume further that time slot timing control circuit 11 has assigned time slot 1 to the connection between stations 1 and 29. Therefore, during time slot 1, timing control circuit 11 places a high signal on lead A as shown in FIG. 2 ($V_A$). The high signal on lead A turns on transistors 8A and 8B in time division switch 8, coupling capacitor 6 to input bus 12. Timing control circuit 11 also couples line circuit 4 to input bus 12 in a similar manner. Assume that station 1 is not transmitting a signal during time slot 1 and therefore no signal appears on capacitor 6 and lead 6A as shown in FIG. 2 ($V_{6A}$). However, assume that station 29 is transmitting a signal during time slot 1 so that signal current is injected through resistor R4 onto input bus 12 during time slot 1, as shown in FIG. 2. The signal current appearing on input bus 12 in FIG. 1 is forwarded by summing amplifier 13 to the inputs of amplifiers 14 and 15. Amplifier 14 is a buffer amplifier with a gain of 1, therefore the signal appearing at its input is forwarded without an amplitude change to diode bridge 20. Amplifier 15, however, has a gain of $k$ and, in addition, is connected in series with inverter 21. Therefore, an inverted signal with an amplitude of $k$ times the signal appearing at the input of amplifier 15 appears at diode gate 22. The operation of diode gates 20 and 22 is well known and is controlled by transistors 16 and 23, and 17 and 24, respectively. Transistors 17 and 23 are controlled by timing control circuit 11 to operate diode bridges 20 and 22 to produce a bipolar signal at the input of buffer amplifier 27. In particular, during the main signal interval of time slot 1, timing control circuit 11 grounds lead C as shown in FIG. 2 ($V_C$). This signal causes transistor 23 in FIG. 1 to turn on in turn causing current to flow in a circuit consisting of 20 volt source 18, resistor 19, transistor 16, the four diodes in diode bridge 20, transistor 23, resistor 26 and negative 20 volt source 25. As is well known, the current flowing through the diodes in diode bridge 20 causes the diodes to become forward biased. Therefore, signals appearing at the output of amplifier 14 are coupled through diode bridge 20 to the input of buffer amplifier 27. Buffer amplifier 27 has a gain of 1 and thus the signals are repeated on return bus 10. Therefore, during the main signal interval of time slot 1, the signal appearing on input bus 12 is forwarded via summing amplifier 13, buffer amplifier 14, enabled diode bridge 20 and buffer amplifier 27 to return bus 10 as shown in FIG. 2 ($V_{10}$). However, during the echo guard interval in time slot 1, timing control circuit 11 places a negative 20 volt signal on lead C. This signal causes transistor 23 to turn off, thus stopping current flow through diode bridge 20. When the current flow through diode bridge 20 ceases, the four diodes become back biased-effectively isolating the output of amplifier 14 from the input of buffer amplifier 27. The signal on return bus 10 is removed as shown in FIG. 2.

Subsequently, during the echo interval of time slot 1, timing control circuit 11 grounds lead D turning on transistor 17 in FIG. 1. Turned-on transistor 17 allows current to flow in the circuit consisting of 20 volt source 18, resistor 19, transistor 17, the four diodes in diode bridge 22, transistor 24, resistor 26 and negative 20 volt source 25. This current flow enables diode bridge 22 which thereupon couples the amplified and inverted signal appearing at the output of inverter 21 to the input of buffer amplifier 27 and return bus 10. Therefore, an inverted amplified signal appears on return bus 10 during the echo interval as shown in time slot 1 of FIG. 2 ($V_{10}$). During the guard interval of time slot 1, timing control circuit 11 applies a negative 20 volt signal to lead C and a positive 20 volt signal to lead D, thus turning off transistors 23 and 17. Diode bridges 20 and 22 are thus disabled and input bus 12 is effectively disconnected from return bus 10. Therefore, no signal appears on return bus 10 as shown in FIG. 2.

In order for line circuit 3 and station 1 to receive signals from line circuit 4 and station 29, timing control circuit 11 applies a high signal to lead B enabling transistors 9A and 9B in time division switch 9, to couple return bus 10 to capacitor 7 via lead 7A. During the normal operation of a time division switching system such as described in the above-mentioned Lewis patent, time division switch 9 would be enabled during the entire signal portion (FIG. 3) of each time slot. However, in accordance with the principles of my invention and as shown in FIG. 2 ($V_B$), the high signal on lead B is only provided during the main signal portion of time slot 1. During the remainder of time slot 1, a low signal is provided on lead B causing transistor 9A and 9B in FIG. 1 to turn off. In the main signal portion of time slot 1, when time division switch 9 is enabled, the voltage on lead 7A is the same as the voltage on the return bus 10 (neglecting charging resistances in time division switch 9). However, during the echo portion of time slot 1, time division switch 9 is open so that voltages appearing on lead 7A are due solely to stray capacitances associated with transistors 9A and 9B in time division switch 9. The voltage which is coupled from return bus 10 to lead 7A is not equivalent to the voltage on return bus 10 but much reduced in amplitude as shown in FIG. 2 ($V_{7A}$).

When the current waveform in time slot 1 on lead 7A ($I_{7A}$) is integrated by capacitor 7 for the sampling period which corresponds to the length of time between two time slots with the same number (such as time slots 1), the resultant voltage will approximately be the difference in signal level present in the positive and negative portions of the pulse. These values are not equal since time division switch 9 was enabled during the main signal portion of time slot 1 but disabled during the echo portion. Therefore, a net signal is forwarded to differential amplifier 5B and hybrid circuit 5A to be processed into voice signals suitable for reception by station set 1.

However, crosstalk noise which feeds through the collector-emitter capacitances in transistors 9A and 9B in other time slots will have the same signal level present in the positive and negative portions because time division switch 9 is in the off-state during the entire time slot. For example, assume timing control circuit 11 has assigned time slot 2 to a different pair of stations other than stations 1 and 29. In this case, timing control circuit 11 applies a low signal to leads A and B to uncouple line circuit 3 from input bus 12 and return bus 10. Line circuit 4 is uncoupled in a similar manner by timing control circuit 11. Assume that a signal is present on input bus 12 from another line circuit (not shown) as shown in FIG. 2 ($I_{12}$). This signal is converted into a bipolar form by pulse splitter 28 as previously described and as shown in FIG. 2 ($V_{10}$). This signal appearing on return bus 10 is again coupled to lead 7A and capacitor 7 in line circuit 3 by leakage capacitances in transistors 9A and 9B in time division switch 9. Since line circuits 3 and 4 are not communicating during time slot 2, this signal energy amounts to crosstalk from one signal channel to another. However, since time division switch 9 is disabled during both the main signal intervals and the echo signal intervals in time slot 2, a much reduced version of the signal on return bus 10 appears on lead 7A, but the positive and negative portions of the pulse still have equal average values. Therefore, when the signal is integrated by capacitor 7 in line circuit 3, the positive and negative portions place equal amounts of charge onto capacitor 7 and tend to cancel, greatly reducing crosstalk noise. As shown in FIG. 2 ($V_{7A}$) the noise energy which feeds through leakage capacitances in time division switch 9 produces a small error when the first portion of the noise pulse is coupled to lead 7A. This error is removed or compensated when the second portion of the bipolar noise pulse reaches lead 7A. Thus, the error is not cummulative. The compensating portion of the bipolar pulse need not follow immediately after the first portion as is shown in the illustrative embodiment but may come later in the same time slot or even in a different time slot as long as it occurs in the sampling interval before the same time slot occurs again.

It is to be understood that the methods shown for reducing crosstalk and noise are applicable to all types of pulse amplitude modulated systems and that the application to the particular time division switching system disclosed was merely for purposes of explanation. In addition, it is within the scope of my invention to devise other ratios between the positive and negative portions of the bipolar pulses than those which have been disclosed. Other timing arrangements may be designed within the scope and spirit of my invention; for example, the echo signal portion of the bipolar pulse pair may precede the main signal portion. Also, the timing of time division switch 9 may be modified without departing from the spirit of my invention. For example, the timing waveform used to control time division switch 9 ($V_B$) may be the same as that used to control time division switch 8 if the signals on input bus 12 are stored and delayed by pulse splitter 28.

In another embodiment, using the principles of my invention, time division switch 9 is turned on to couple bipolar pulse signals on return bus 10 to line circuit 3 during all time slots. However, during the time slot containing the speech signals for station set 1, time division switch 9, is turned off during the echo signal portion of the time slot. In time slots which are not associated with station set 1, the positive and negative portions of bipolar pulses on return bus 10 have equal average values and thus tend to cancel. During the time slot associated with station set 1, the average values of the positive and negative portions are not equal since time division switch 9 is turned off during one portion, thus a net signal is derived.

What is claimed is:

1. A pulse amplitude modulated time division switching system comprising a plurality of sources of low frequency information, a sampling bus, means for applying pulses modulated by said information sources to said bus in a repetitive multiplexed sequence, said applying means including means for generating for each information modulated pulse a pair of pulses, each pulse of said pulse pair having an equal average value but being opposite in polarity, a plurality of outputs, means for repetitively connecting said outputs to said sampling bus so that each of said outputs receives pulses from one of said information sources, said connecting means including means for connecting said outputs to receive the first pulse of said pulse pair, but to block the second pulse of said pulse pair, and means for integrating the received pulses to recover said low frequency information.

2. A switching system according to claim 1 wherein said generating means further comprises means for generating the first pulse of said pulse pair with the same polarity and an amplitude proportional to the amplitude of said information modulated pulse and means for generating the second pulse of said pulse pair with an opposite polarity as said information modulated pulse.

3. A switching system according to claim 2 wherein said means for generating the first pulse of said pulse pair and said means for generating the second pulse of said pulse pair are connected in parallel and wherein said applying means further comprises timing means for sequentially controlling said first pulse generating means and said second pulse generating means to generate said bipolar pulse pair.

4. A method for increasing the signal to noise ratio in a time division switching network having a plurality of sources of low frequency information, a sampling bus having pulses modulated by said information sources impressed thereon in a repetitive multiplexed sequence, a plurality of outputs, means for repetitively connecting said outputs to said sampling bus so that each of said outputs receives pulses from one of said information sources, and means for integrating the received pulses to recover said low frequency information, said method comprising the steps of,
   a. converting each of said information modulated pulses to a pair of pulses, each pulse of said pulse pair having a substantially equal average value, but being opposite in polarity, and
   b. controlling said connecting means to connect said outputs to receive the one pulse of said pulse pair, but to block the other pulse of said pulse pair.

5. An arrangement for increasing the signal to noise ratio in a time division switching network having a plurality of sources of low frequency information, a sampling bus having pulses modulated by said information sources impressed thereon in a repetitive multiplexed sequence, a plurality of outputs, means for repetitively connecting said outputs to said sampling bus so that each of said outputs receives pulses from one of said information sources and means for integrating the received pulses to recover said low frequency information, said arrangement comprising,
   means for converting each of said information modulated pulses to a pair of pulses, each pulse of said pulse pair having a substantially equal average value, but being opposite in polarity, and
   means for controlling said connecting means to connect said outputs to receive one pulse of said pulse pair, but to block the other pulse of said pulse pair.

6. An arrangement according to claim 5 wherein said converting means further comprises two switchable channels connected in parallel to said sampling bus for processing said information modulated pulses, one of said switchable channels inverting information pulses passing therethrough.

7. In a switching system having a plurality of communications stations each having means for generating amplitude modulated pulses, a common communications bus having an input and an output, means for connecting said stations in pairs in a time slot associated with said pair to said input and said output of said bus for allowing said amplitude modulated pulses to pass between said stations, an improvement for reducing noise and crosstalk comprising
   means inserted between said input and said output of said bus for converting said amplitude modulated pulses appearing on said input of said bus into two pulses having equal average values, but being opposite in polarity, and
   means for controlling said connecting means to pass the one of said two pulses in said time slot associated with said station pair to said associated station, but to block the other pulse of said two pulses in said time slot associated with said pair.

8. A method for reducing crosstalk and noise in a switching system wherein pairs of stations are sequentially connected in pairs of a common bus in an associated time slot to transfer information by means of amplitude modulated pulses, said method comprising the steps of
   a. converting each of said amplitude modulated pulses to a pair of pulses, each pulse of said pair of pulses having equal average values, but being opposite in polarity,
   b. connecting said pairs of stations to said common bus to receive said amplitude modulated pulse pairs present on said bus during substantially all time slots,
   c. disconnecting said pairs of stations from said common bus during part of said associated time slot so that one of said pair of amplitude modulated pulses is received and the other of said pair of amplitude modulated pulses is not received,
   d. integrating said received amplitude modulated pulses to extract information therefrom.

9. An arrangement for reducing crosstalk and noise in a pulse amplitude modulated switching system having a common bus with an input and an output, a plurality of communicating stations producing modulated information pulses, each of said stations being connectable to said common bus by a time division switch and timing means for controlling said time division switches to connect said communicating stations in pairs to said input and said output of said common bus during a respective time slot, said arrangement comprising,
   a main channel connectable between said input and said output of said common bus for passing said modulated information pulses therethrough with the same polarity,
   an echo channel connectable between said input and said output of said common bus in parallel with said main channel for passing said modulated information pulses therethrough with inverted polarity,
   means for connecting said main channel and said echo channel sequentially between said input and said output of said common bus to produce a modulated bipolar pulse at said output for each modulated information pulse appearing at said input, said bipolar pulse having equal average values in the positive and negative portions,
   means associated with said timing means for controlling said time division switches so that an associated communicating station receives only one portion of said bipolar pulse in said respective time slot and does not receive the other portion of said bipolar pulse.

10. An arrangement according to claim 9 wherein said connecting means further comprises a diode bridge switch in series with said main and said echo channels and means associated with said timing means for controlling said diode bridge switches sequentially to produce said bipolar pulse.

11. A method for reducing crosstalk and noise in a switching system having a plurality of stations sequentially connectable to a common bus in an associated time slot to transfer information therebetween, means controlled by said stations for generating bipolar amplitude modulated information pulses on said common bus, said pulses having a positive and a negative portion of equal average value, and means associated with each of said stations for receiving said information pulses, said method comprising the steps of 1. connecting one pair of said plurality of stations to said common bus in an associated time slot to allow one portion of a bipolar information pulse generated under control of one station of said connected station pair to reach the receiving means associated with the other station of said connected station pair, and 2. disconnecting said other station from said common bus to prevent the other portion of said bipolar pulse generated under control of said one station from reaching said receiving means associated with said other station.

* * * * *